UNITED STATES PATENT OFFICE.

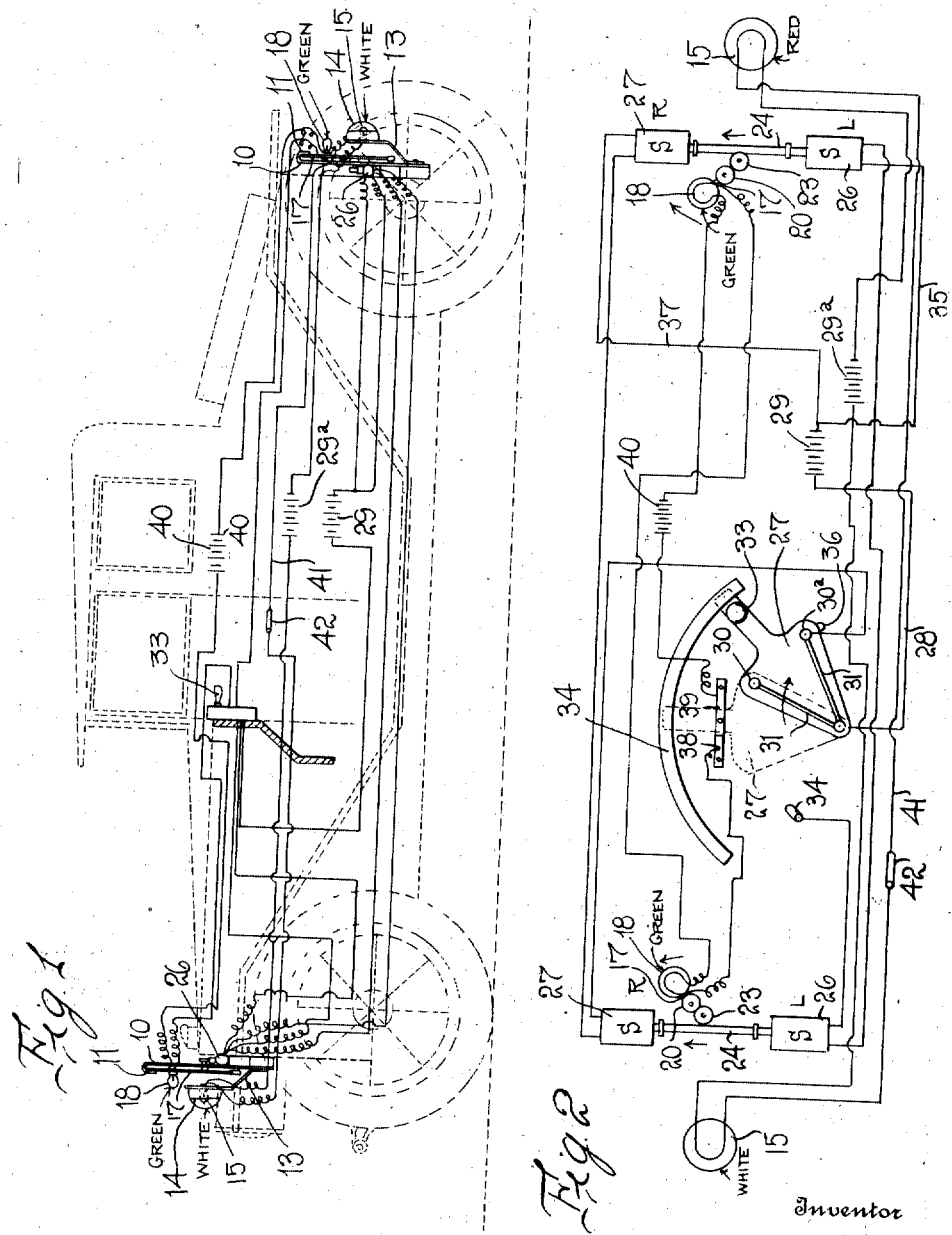

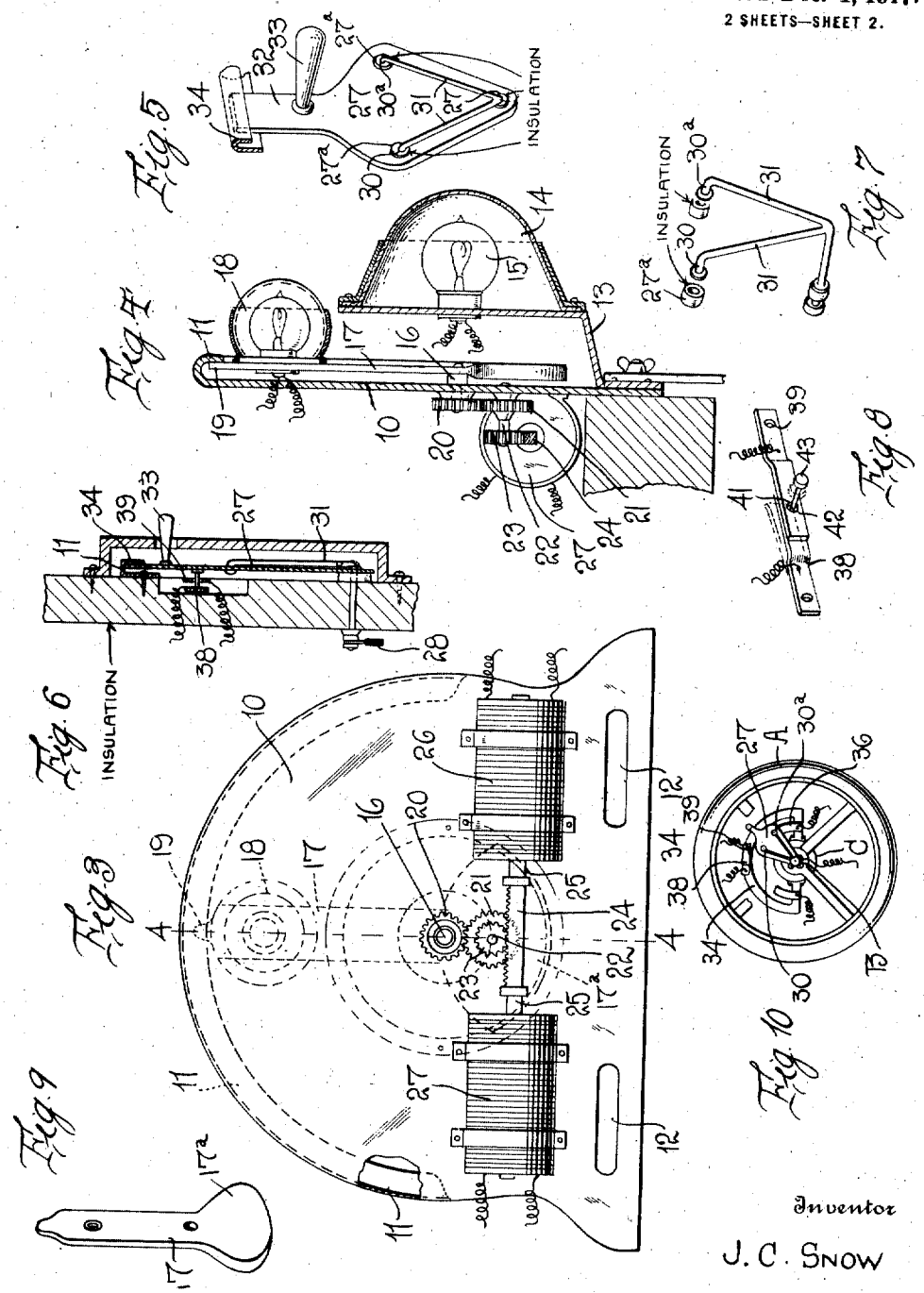

JOSEPH C. SNOW, OF BROCKTON, MASSACHUSETTS.

DIRECTION-SIGNAL FOR AUTOMOBILES.

1,249,229.
Specification of Letters Patent.
Patented Dec. 4, 1917.

Application filed August 16, 1916. Serial No. 115,248.

*To all whom it may concern:*

Be it known that I, JOSEPH C. SNOW, a citizen of the United States, residing at Brockton, in the county of Plymouth and State of Massachusetts, have invented certain new and useful Improvements in Direction-Signals for Automobiles, of which the following is a specification, reference being had to the accompanying drawings.

This invention relates to signals, and particularly to those signals which are mounted upon automobiles or like vehicles for the purpose of indicating whether the vehicle is about to move or is moving to the right or to the left so that oncoming vehicles either from the front or rear may note a movement of the automobile and take precautions accordingly.

The general object of the invention is the provision of a very simply operated and distinctly observable signal of this character which shall not depend upon mechanical contrivances for its movement and which shall at ordinary times be unobservable, but in which the signal lamps will become energized upon a signal actuating member being operated and in which this signal lamp shall travel to the right or to the left as the signal actuating member is shifted to the right or left.

A further object of the invention is the provision of a device of this character wherein white and red lights are used, respectively, upon the front and rear of the vehicle, and in which there is a green light disposed in conjunction with the white or red light and movable concentrically around it, electrical means being provided for energizing the green lights at the forward and tail end of the vehicle and shifting these lights concentrically to the main signal lights in one direction or the other.

A further object of the invention is the provision of a very effective signaling device comprising a white disk, in the approximate center of which is mounted a white or red light, and mounting upon this white disk a green arrow-shaped signaling member carrying a green light, the arrow-shaped member being shiftable across the face of the disk by electrically operated mechanism.

The invention is illustrated in the accompanying drawings, wherein:

Figure 1 is an elevation of an automobile shown in dotted lines, with my signaling device applied thereto, the supports and signaling devices being shown in full lines;

Fig. 2 is a wiring diagram of my signaling system;

Fig. 3 is a rear face view of the signal supporting plate showing the solenoids and the signaling arm operating mechanism;— plate 11 being partly broken away.

Fig. 4 is a sectional view of the construction illustrated in Fig. 3, on the line 4—4 of Fig. 3;

Fig. 5 is a perspective view of the actuating or circuit closing member;

Fig. 6 is a vertical section of the same mounted upon the dash-board of the vehicle;

Fig. 7 is a perspective view of the conductors and contacts on the actuating member detached therefrom;

Fig. 8 is a perspective of the circuit closer for the green lights;

Fig. 9 is a perspective detail view of the signal arm; and

Fig. 10 is a plan view showing my device as applied to the steering wheel of an automobile.

Referring to these figures, I will first describe the signal *per se*, it being understood that there are two of these signals, one mounted upon the front end of the vehicle and the other upon the rear end thereof. The signaling device comprises a plate 10 of metal having a straight lower edge and an arcuate upper edge which is adapted to be fastened to the automobile in any suitable manner, the arcuate edge having an inturned flange 11. The lower edge of the plate is provided with slots 12 whereby a plate is provided with slots 12 whereby a license plate may be attached to the signal plate. Preferably this plate 10 is enameled white so that it may be distinctly seen. Mounted upon the plate in any suitable manner is an outwardly projecting bracket 13 carrying a lamp housing 14 with a suitable lens or door of glass, and mounted within the lamp housing is an electric lamp 15. The light issuing from this lamp housing is preferably white in front and red in rear.

Pivotally mounted upon a shaft 16, passing through the plate 10 and operatively supported therein in any suitable manner, is an arm 17 which at its outer end carries a small lamp housing inclosing a green lamp 18. The extremity of the arm is formed with a terminal end 19 which engages beneath the flange 11 so as to prevent the arm from being shifted outward too far. Mounted upon the shaft 16 is a gear wheel 20, and meshing therewith is a gear wheel 21 and mounted upon the shaft 22 of this gear wheel 21 is a pinion 23 meshing with a rack 24. The rack is supported in any suitable manner and has its ends connected to the cores 25 of the solenoids 26 and 27. It will be obvious now that when one of these solenoids is energized the rack 24 will be shifted in one direction, thus shifting the signal arm in one direction, and when the other solenoid is energized the signal arm will be shifted in the reverse direction, and that because of the gearing between the rack and the pivot of the signal arm the signal arm will be shifted a relatively large angular distance by a relatively small movement of the cores of the solenoids. As before stated, there are two of these signals, one mounted at the forward end of the machine and one upon the rear end thereof, so that the indication of the movement of the vehicle may be observable to machines approaching either the front or rear of the machine on which the signal is installed.

The means whereby the solenoids are energized is illustrated most clearly in the diagrammatic view, Fig. 2. Mounted in any suitable manner, either upon the dash or preferably in conjunction with the steering wheel of the machine, is an arm 27 which at its pivotal center is connected by means of a wire 28 to a battery 29. This arm 27 is made of non-conducting material and carries the contacts 30 and 30ª, each of these contacts being electrically connected to the wire 28 by means of the conductors 31. It will of course be understood that the arm 27 might be made of conducting material such as metal, provided the conductor 29 and the contacts 29 and 30 are thoroughly insulated from the metal as by the sleeves 27ª. The arm 27 is extended, as at 32, and carries upon it a knob 33 or other means whereby it may be operated, this extension 32 traveling under an arcuate guide 34. Disposed in the path of travel of contact 30, when the arm 27 is shifted to the left in Fig. 2, is a contact 34 which is connected in series with the solenoids 26 of the front and rear lights. These solenoids in turn are connected by the conductor 35 to the battery 29 or other source of energy.

Disposed in the path of movement of the contact 30ª when the arm 27 is shifted to the right, is a contact 36 connected in series with the solenoids 25 which in turn are connected by the conductor 37 to the battery 29. It will thus be seen that when the arm 27 is shifted to the extreme left, a circuit will be established between the battery and the solenoids 26 and when the arm 27 is shifted to the extreme right, a circuit will be established through the solenoids 25. The establishment of the circuit through the solenoids 25 will obviously shift the arrow-like arm and the light 18 to the right, while the establishment of the circuit through the solenoids 26 will shift the signal light and the signal light carrying arm to the left. In other words, the signal light carrying arm shifts in exactly the same direction as does the arm 27. Means should be provided for normally yieldingly holding the signal light carrying arm 17 at its normal position and urging it to this position when the solenoids are deënergized, and this means may be in the form of opposed springs or of a weight 17ª, as illustrated in Fig. 9.

Normally the green signal lamp 18 carried by the arm 17 is deënergized, and it is necessary to provide means for energizing this lamp as soon as the arm 27 is shifted. For this purpose I provide beneath the extension 32 of the arm 27 a switch including two contact members 38 and 39 normally urged into contact with each other, these two members constituting a circuit breaker and are connected in circuit with the front green lamp 18 and the rear green lamp 18 and with a battery or other source of power 40. One of the contact members, as for instance, the contact member 38, is formed with a pin or other projection 41 which extends through a slot 42 in the other contact member, the pin being provided with a head 43 which is adapted to be engaged by the extension 32 of the arm 27 so that when the arm is turned to its middle position it will depress the head 43 and force the contact members 38 and 39 out of engagement with each other, breaking the circuit through the battery and the green lights (see Fig. 6), but when the arm 27 is shifted from its middle position in either direction, the contacts 38 and 39 will spring into electrical engagement with each other and the circuit will be closed through the green lights.

In Fig. 10, I have illustrated the actuating member as being applied to the steering wheel A of an automobile. In this case the arm 27 is mounted upon the steering post B of the automobile or concentrically thereto, and the contacts 34 and 36 are operatively supported on the housing C of the steering post so as not to rotate. The sector 34 is also mounted upon this housing, as is the circuit breaker formed by the members 38 and 39. The arm 27 may be mounted upon one of the spokes of the steering wheel so that as the steering wheel is shifted, the arm will be shifted with it and thus, as the machine is steered to the left, the circuit through the front and rear green lights will be immediately completed and as the wheel is shifted still farther to the right or to the left the green lights will commence to move upon the plate 10, either to the right or to the left, to indicate the proposed direction of movement of the automobile. It will be understood that it is entirely within the scope of my invention, however, to mount the arm 27 and allied parts in any suitable manner and not in connection with the steering wheel. It will be seen that if the arm 27 is mounted in conjunction with the steering wheel that a slight turning movement will immediately energize the green signal lights and thus automobilists ahead or behind the car will be warned that a change in direction is contemplated. Then if the wheel is turned back to its normal position these lights will go out and only the white lights at the front of the automobile or the red light at the tail end thereof will be displayed. If, however, the driver intends to turn at right angles to his course, the turning of the arm 27 to such position will ignite the green signal lights and will cause the green signal lights to move as the machine turns. When the wheel is shifted back to its original position, however, connection through the solenoids will be broken, the solenoids will become dead, and the means heretofore described will act to return the signal arm to its middle position.

The white and red signal lights 14 are disposed upon a certain circuit and connected with a battery 29*, this circuit being controlled by any ordinary switch. The circuit wires are designated 41 and the switch 42. This switch, of course, is to be mounted on the dash or in any other suitable and convenient position.

I also wish it understood that though I preferably use a white light 14 at the front of the machine and a red light 14 at the rear of the machine, yet I do not wish to be limited to this, though as it is common to have a white light at the forward end of the machine and a red light at the rear thereof, I prefer this arrangement of the lights. While I have described a green light and described the lamps 18 as being green, here again I do not wish to be limited to the color as it is obvious that other colors might be used though I find that green is preferable.

While I have illustrated certain details of construction which I believe to be peculiarly effective, I wish it understood that these details may be varied in many ways without departing from the spirit of the invention.

Having described my invention, what I claim is:

1. In a direction signal for automobiles, forward and rear vertically disposed supporting plates, a bracket extending from the front of each supporting plate, a lamp housing mounted upon said bracket and inclosing a signal lamp, a signal arm pivotally mounted upon each of said plates and movable concentric to the axis of the first named lamp, oppositely disposed motors for each signal arm, means operated by the motors for shifting said arm, a signal light mounted upon each arm and normally in an open circuit with a source of current, a pivotally mounted actuating member shiftable in either direction from a middle position, a pair of contacts carried thereby spaced from each other, each in circuit with a source of power, fixed contact members disposed one on each side of the arm and in the path of movement of the contacts carried thereby and connected each in circuit with one pair of the motors whereby when the arm is shifted in one direction, like motors on the front and rear of the machine, will be energized and when the arm is shifted in the opposite direction, the like motors on the front and rear of the machine will be energized, a circuit including the lamps on the movable arms and a source of current, a circuit breaking device disposed in the path of movement of said actuating arm and acting to close the circuit through both of said lights and the source of current, said arm when moved to a middle position actuating said circuit breaking device to break the circuit through said lights, but when shifted laterally in either direction permitting the circuit to be closed.

2. In a direction signal for automobiles, a signal light, a circuit closing device comprising contact springs urged into electrical engagement with each other, the springs being connected in circuit with a source of power and said light, an actuating arm movable from a middle position in either direction out of or into operative engagement with said contacts, and means whereby when the actuating arm is moved into such engagement, the contacts will be separated from each other, said means including a pin on one spring projecting through an opening in the other spring, the pin being in the path of movement of and depressible by the actuating arm when the latter is shifted to a middle position.

3. In an automobile, the combination with the steering wheel thereof, of forward and rear signal lights supported for movement in a vertical plane, oppositely disposed solenoids operatively engaging each signal light whereby to shift the signal light in one direction or the other from a middle position depending upon the solenoid which is energized, and means for energizing one or the other of the solenoids and said signal lamps comprising an actuating member mounted upon the steering wheel of the automobile and movable therewith and having a pair of contacts thereon adapted when the steering wheel is turned in one direction to connect one pair of solenoids with the source of energy and the one in the other direction to connect the other pair of solenoids with the source of energy, and means carried by said arm and normally breaking the circuit through the electric lights when the arm is in a median position but permitting the closing of the circuit through the signal lights when the arm is shifted in a direction from the steering wheel through either of said solenoids.

4. In a direction signal for automobiles, a white supporting plate having an arcuate margin with an inturned flange, a bracket mounted upon the plate and extending out therefrom, a signal lamp carried upon the bracket, an arm pivotally mounted upon the plate and having one extremity engaging beneath the flange, the other extremity being weighted, a signal lamp carried by said arm, oppositely disposed solenoids, cores therefor, a rack carried by said cores, gearing operatively connecting the arm with said rack whereby the arm may be shifted upon a movement of the rack, and means for closing the circuit through one or the other of said solenoids.

In testimony whereof I hereunto affix my signature in the presence of two witnesses.

JOSEPH C. SNOW.

Witnesses:
 OBADIAH LYON,
 GEORGE W. STEDMAN.